United States Patent
Tsukamoto

(10) Patent No.: US 10,151,889 B2
(45) Date of Patent: Dec. 11, 2018

(54) OPTICAL CONNECTOR AND BRANCH STRUCTURE OF WIRE HARNESS

(71) Applicant: Yazaki Corporation, Minato-ku, Tokyo (JP)

(72) Inventor: Masashi Tsukamoto, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/863,180

(22) Filed: Jan. 5, 2018

(65) Prior Publication Data

US 2018/0196202 A1    Jul. 12, 2018

(30) Foreign Application Priority Data

Jan. 11, 2017 (JP) ................................ 2017-002776

(51) Int. Cl.
*G02B 6/38* (2006.01)
*H01R 11/11* (2006.01)
*H01R 12/71* (2011.01)

(52) U.S. Cl.
CPC ......... *G02B 6/3873* (2013.01); *G02B 6/3817* (2013.01); *G02B 6/3885* (2013.01); *G02B 6/3893* (2013.01); *H01R 11/11* (2013.01); *H01R 12/716* (2013.01)

(58) Field of Classification Search
CPC .... G02B 6/387; G02B 6/3807; G02B 6/3813; G02B 6/3817; G02B 6/3825; G02B 6/3849; G02B 6/3869; G02B 6/3873; G02B 6/3885; G02B 6/3893; H01R 11/11; H01R 12/716
USPC ........................ 385/55, 58, 59–61, 70–72, 75
See application file for complete search history.

(56) References Cited

U.S. PATENT DOCUMENTS

| | | | |
|---|---|---|---|
| 7,048,447 B1 * | 5/2006 | Patel .................... | G02B 6/3885 385/59 |
| 8,632,258 B2 * | 1/2014 | Jibiki .................. | G02B 6/3849 385/72 |

FOREIGN PATENT DOCUMENTS

JP    2014-202836 A    10/2014

* cited by examiner

*Primary Examiner* — Michael Mooney
(74) *Attorney, Agent, or Firm* — Banner & Witcoff, Ltd.

(57) ABSTRACT

An optical connector includes a first connector portion having a first optical fiber, a second connector portion having a second optical fiber, and an aligning part. The second connector portion includes a fitting recessed portion in which the first connector portion is fitted. The second connector portion is joined closely in a direction orthogonal to axes of the first and second optical fibers by the first connector portion. The aligning part includes side walls of the fitting recessed portion gradually closing to each other in a fitting direction of the first connector portion to the fitting recessed portion, and side surfaces of the first connector portion inclined at the same inclination angle as the side walls of the fitting recessed portion.

4 Claims, 19 Drawing Sheets

OPTICAL CONNECTOR AND BRANCH STRUCTURE OF WIRE HARNESS

CROSS REFERENCE TO RELATED APPLICATIONS

This application claims priority from Japanese Patent Application No. 2017-002776 filed on Jan. 11, 2017, the entire contents of which are incorporated herein by reference.

BACKGROUND OF THE INVENTION

Field of the Invention

The present invention relates to an optical connector and a branch structure of a wire harness.

Description of Related Art

An optical fiber is used as signal transmission means for multiplex communication in a vehicle. As illustrated in FIG. 18, as an optical connector that connects optical fibers as signal transmission means to perform optical communication, there is an optical connector that is provided with a plug side optical connector 103 and a receptacle side optical connector 104 which respectively have optical fibers 101 and 102 at the center, and in which the plug side optical connector 103 is inserted into the receptacle side optical connector 104, and aligns/holds the plug side optical connector 103 with respect to the receptacle side optical connector 104 to connect the optical fibers 101 and 102 to each other (refer to Patent Document 1).

[Patent Document 1] JP-A-2014-202836

Incidentally, as illustrated in FIG. 19, in an optical connector having a connection structure as described above, when connecting a plug side optical connector 103 to a receptacle side optical connector 104, the plug side optical connector 103 is brought close to the receptacle side optical connector 104 along the axial direction of optical fibers 101 and 102 from the front side of the receptacle side optical connector 104. Therefore, in the optical connector, when the plug side optical connector 103 is connected to the receptacle side optical connector 104, the optical fiber 101 of the plug side optical connector 103 has to previously have an extra length 105 to slacken the optical fiber 101, and improvement in connection workability is desired.

SUMMARY

One or more embodiments provide an optical connector and a branch structure of a wire harness which are excellent in connection workability.

In an aspect (1), an optical connector includes a first connector portion having a first optical fiber, a second connector portion having a second optical fiber, and an aligning part. The second connector portion includes a fitting recessed portion in which the first connector portion is fitted. The second connector portion is joined closely in a direction orthogonal to axes of the first and second optical fibers by the first connector portion. The aligning part includes side walls of the fitting recessed portion gradually closing to each other in a fitting direction of the first connector portion to the fitting recessed portion, and side surfaces of the first connector portion. Inclination angles of side surfaces of the first connector portion correspond to inclination angles of the side walls of the fitting recessed portion. The aligning part joins the first connector portion to the second connector portion so as to align the first and second optical fibers with each other. The first connector portion is fitted into the fitting recessed portion of the second connector portion and the side walls and the side surfaces are into contact with each other, so that the first and second optical fibers are aligned with each other.

In an aspect (2), an optical connector includes a first connector portion having a first optical fiber, a second connector portion having a second optical fiber, an aligning part and a pressing part. The second connector portion includes a fitting recessed portion in which the first connector portion is fitted. The second connector portion is joined closely in a direction orthogonal to axes of the first and second optical fibers by the first connector portion. The first connector portion is fitted into the fitting recessed portion, and the pressing part presses the first connector portion towards the second connector portion along an axial direction of the first and second optical fibers. The aligning part includes an aligning recessed portion and an aligning projecting portion which are mutually fitted into each other. The aligning part joins the first connector portion to the second connector portion and aligns the first and second optical fibers with each other. Each of the aligning recessed portion and the aligning projecting portion has a circular shape gradually narrowing towards a fitting direction of the aligning projecting portion to the aligning recessed portion in a cross-sectional view. The aligning recessed portion and the aligning projecting portion are fitted to each other and the first and second optical fibers are aligned with each other.

In an aspect (3), a branch structure of a wire harness includes a branch connector including the optical connector according to the aspect (1) or (2). The branch connector branches and connects a branch harness having a plurality of branch lines to a main line harness having a plurality of main lines. The branch connector includes a circuit board to which the branch line is connected, a board side terminal mounted on the circuit board, and a main line side terminal connected to the main line and connectable to the board side terminal. The first connector portion is held in a holder provided in the main line. The second connector portion is mounted on the circuit board. A joining direction of the first connector portion held in the holder to the second connector portion and a connecting direction of the main line side terminal to the board side terminal are the same direction.

According to the aspect (1), when the first connector portion is fitted into the fitting recessed portion close to the second connector portion in the direction orthogonal to the axis of the optical fiber, both the side walls of the fitting recessed portion and both side surfaces of the first connector portion are brought into contact with each other so that the optical fibers are aligned with each other. As a result, the optical fibers of the first connector portion and the second connector portion can be easily aligned with and optically connected to each other so as to enable optical communication with each other.

Therefore, compared to the optical connector that connects the optical fibers by bringing the connector portions close to each other along the axial direction of the optical fiber, it is possible to eliminate the work of loosening the optical fiber before connection and securing an extra length in advance, and to improve connection workability.

According to the aspect (2), when the first connector portion is fitted into the fitting recessed portion close to the second connector portion from the direction orthogonal to the axis of the optical fiber, the aligning recessed portion and the aligning projecting portion are fitted into each other by the pressing means, and the optical fibers are aligned with each other. As a result, the optical fiber of the first connector portion and the second connector portion are easily aligned with and optically connected to each other so as to enable optical communication with each other.

Therefore, compared to the optical connector that connects the optical fibers by bringing the connector portions close to each other along the axial direction of the optical fiber, it is possible to eliminate the work of loosening the optical fiber before connection and securing an extra length in advance, and to improve connection workability.

According to the aspect (3), since the joining direction of the first connector portion held by the holder provided on the main line to the second connector portion and the connecting direction of the main line side terminal to the board side terminal are the same direction as each other, it is possible to collectively perform the optical connection between the optical fibers and the electrical connection between the main line side terminal and the board side terminal. As a result, it is possible to significantly improve branch connection workability of connecting the branch harness to the main line harness to branch the branch harness and the main line harness.

According to one or more embodiments, it is possible to provide an optical connector and a branch structure of a wire harness which are excellent in connection workability.

Hereinbefore, the invention is briefly described. Furthermore, the details of the invention will be further clarified by reading an aspect to perform the invention (hereinafter, referred to as "embodiment") described below with reference to the attached drawings.

BRIEF DESCRIPTION OF THE DRAWINGS

FIG. 4A is a cross-sectional view taken along a line A-A in FIG. 3 in the connected state, FIG. 4B is a cross-sectional view taken along a line B-B in FIG. 3 in the connected state, and FIG. 4C is a cross-sectional view taken along a line C-C in FIG. 3 in a connected state.

FIG. 5A is a cross-sectional view taken along the line A-A in FIG. 3 before connection, and FIG. 5B is a cross-sectional view taken along the line A-A in FIG. 3 in the middle of connection.

FIG. 7A is a cross-sectional view taken along a line D-D in FIG. 6 before connection, and FIG. 7B is a cross-sectional view taken along a line E-E in FIG. 6 before connection.

FIG. 8A is a cross-sectional view taken along the line D-D in FIG. 6 after connection, and FIG. 8B is a cross-sectional view taken along the line E-E in FIG. 6 after connection.

FIG. 13A is a side view of a plug holder in a cross-sectional view of the optical receptacle in the middle of connection, and FIG. 13B is a side view of a plug holder in a cross-sectional view of the optical receptacle after connection.

FIG. 17A is a longitudinal sectional view taken along an axis of an optical fiber in the middle of connection, and FIG. 17B is a longitudinal sectional view taken along the axis of the optical fiber after connection.

DETAILED DESCRIPTION

Hereinafter, Exemplary embodiments are described with reference to the drawings.

First, a configuration of a wire harness will be described.

Figure 1:
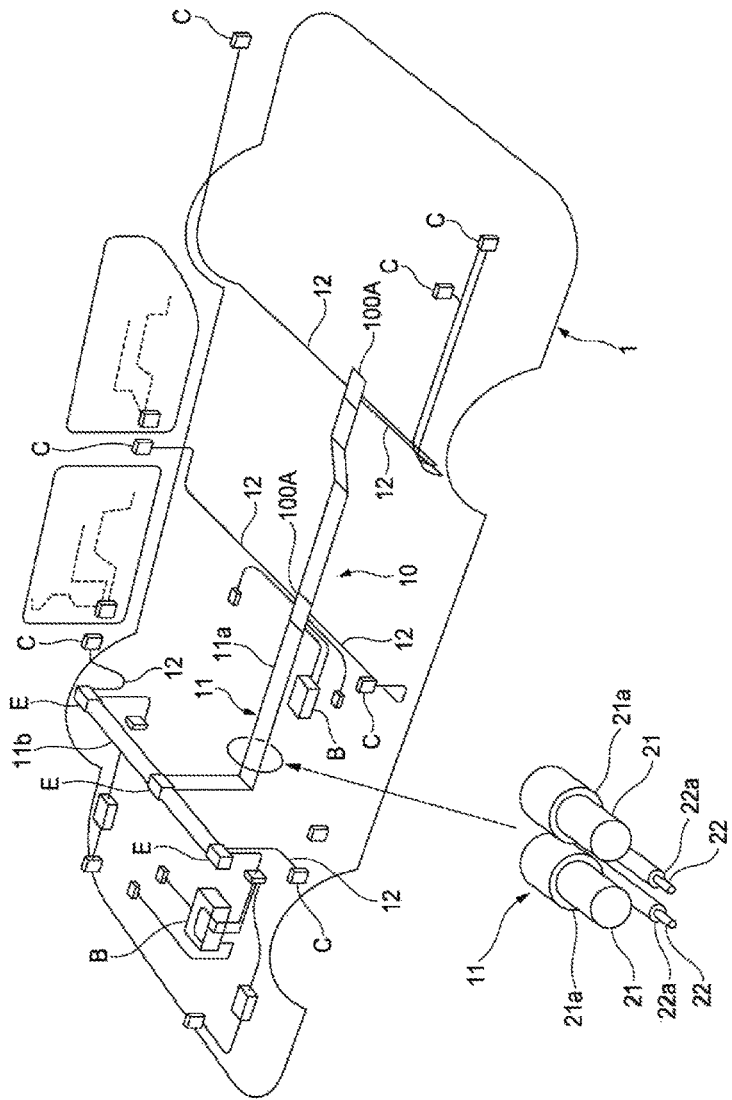
FIG. 1 is a schematic perspective view of a vehicle body on which a wire harness is arranged.

FIG. 1 is a schematic perspective view of a vehicle body on which the wire harness is arranged.

As illustrated in FIG. 1, a wire harness 10 is used as a power supply path that supplies electric power of a power supply B such as a main battery and a sub battery mounted on a vehicle to electric equipments serving as accessories of each part of a vehicle body 1, a transmission path necessary for transmitting and receiving signals to and from the electrical equipments, and the like.

The wire harness 10 is provided with a main line harness 11 and a plurality of branch harnesses 12. The main line harness 11 is formed in a simple shape like a spine (backbone) of the vehicle body 1. The main line harness 11 is configured by bundling a main line 21 such as a power line and a ground line and an optical fiber 22 serving as a signal line such as a communication line and a signal line. In the example, the main line harness 11 is provided with two main lines 21 and two optical fibers 22.

The main line 21 is an electric wire in which a single wire made of a conductive metal material such as aluminum is covered with a coating 21a, and is a rigid wire made of a round bar having a circular cross section. The main line 21 may be a stranded wire in which the outer periphery of a core wire formed by twisting elemental wires made of copper or a copper alloy or the like is covered with the coating 21a.

The optical fiber 22 has a structure in which the outer periphery of a glass fiber including a core and a clad is covered with the coating 22a. The optical fiber 22 is used as signal transmission means for performing multiplex communication in a vehicle by optical communication.

The main line harness 11 is roughly divided into a floor main line harness 11a and an instrument panel main line harness 11b. The floor main line harness 11a is disposed so as to extend in the front-rear direction of the vehicle body 1 substantially in the center in the horizontal direction of the vehicle body 1 along the floor in the vehicle interior. The instrument panel main line harness 11b is linearly disposed in the horizontal direction so as to be substantially parallel to a lean hose at a portion along a surface of a dash panel (not illustrated).

The branch harness 12 is connected to the main line harness 11. A connector C is connected to an end portion of the branch harness 12, and a connector of an electrical component provided in each part of the vehicle body 1 is connected to the connector C. In addition, various control boxes E are connected to the main line harness 11. As a result, power is supplied from a power source B and signal distribution from each control box E is performed on the electrical components of each part.

In the wire harness 10 described above, a branch connector 100A is provided at a connection point between the main line harness 11 and the branch harness 12. The main line harness 11 and the branch harness 12 are connected by the branch connector 100A.

Next, a branch structure in the branch connector 100A will be described.

First Embodiment

Figure 2:
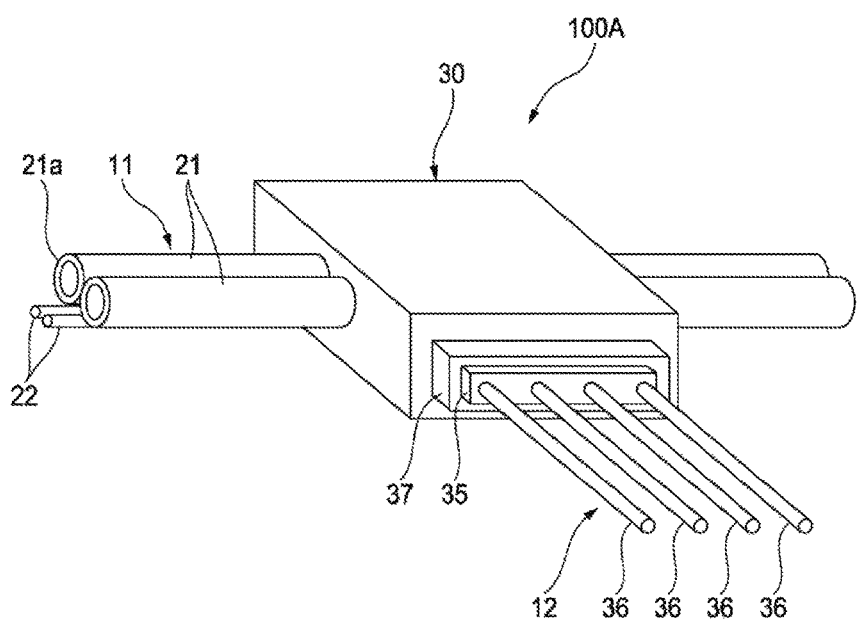
FIG. 2 is a perspective view of a branch connector.
Figure 3:
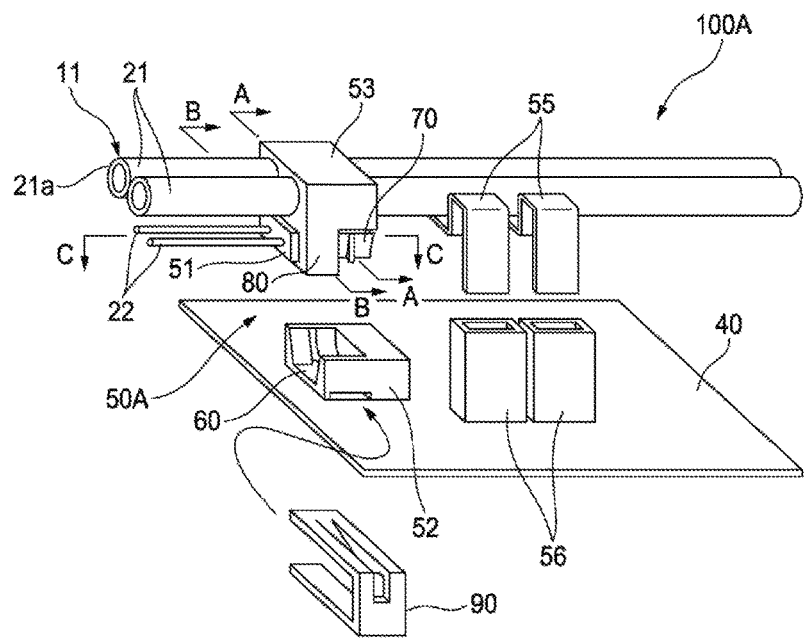
FIG. 3 is an exploded perspective view of a branch connector provided with an optical connector according to a first embodiment.

FIG. 2 is a perspective view of a branch connector. FIG. 3 is an exploded perspective view of a branch connector provided with an optical connector according to a first embodiment.

As illustrated in FIG. 2, the branch connector 100A is provided with an accommodation case 30 formed in a box shape. The accommodation case 30 is formed to include an insulating resin. The accommodation case 30 includes, for example, a lower case and a cover covered on the lower case, and has an accommodation space inside thereof.

In the accommodation case 30, the main line 21 and the optical fiber 22 are passed from one end side and the main line 21 is drawn out from the other end side. In addition, on one side of the accommodation case 30, a branch side connector 35 is inserted and connected to a connector 37 provided in the accommodation space.

In the branch side connector 35, terminals (not shown) connected to the end portion of a branch line 36 constituting the branch harness 12 are accommodated. Therefore, the branch side connector 35 is connected to the connector 37 of the branch connector 100A, so that the terminal of the branch side connector 35 to which the branch line 36 is connected and the terminal provided in the connector 37 in the accommodation space are electrically connected to each other.

As illustrated in FIG. 3, in the accommodation space of the accommodation case 30, a circuit board 40 and an optical connector 50A are accommodated.

The circuit board 40 includes a rigid printed circuit board, and the connector 37 to which the branch side connector 35 is connected is mounted on this circuit board 40.

The optical connector 50A has an optical plug (first connector portion) 51, an optical receptacle (second connector portion) 52, and a plug holder (holder) 53.

The optical plug 51 is connected to the end portion of the optical fiber 22 bundled in the main line 21, and the optical plug 51 is held in the plug holder 53. The plug holder 53 is fixed to the two main lines 21.

The optical receptacle 52 is mounted on the circuit board 40. The optical receptacle 52 is provided with a photoelectric conversion element (not illustrated). As the photoelectric conversion element, for example, there are a light emitting laser (Vertical Cavity Surface Emitting Laser: VCSEL) for converting an electric signal into an optical signal and a photodiode (PD) for converting an optical signal into an electric signal. The photoelectric conversion element of the optical receptacle 52 is connected to the terminal of the connector 37 via a conductor pattern (not illustrated) provided on the circuit board 40.

A male terminal (main line side terminal) 55 is provided in a portion accommodated in the accommodation case 30 in each main line 21. These male terminals 55 are conductively connected to the conductors of the main line 21, respectively. In addition, on the circuit board 40, a female terminal (board side terminal) 56 connectable to the male terminal 55 is mounted. These female terminals 56 are connected to the terminals of the connector 37 via the conductor patterns of the circuit board 40.

In the optical connector 50A, the plug holder 53 of the main line harness 11 is installed close to the optical receptacle 52 from the upper side orthogonal to the axial direction of the optical fiber 22, so that the optical plug 51 held by the plug holder 53 is fitted into the optical receptacle 52 from the upper side orthogonal to the axial direction of the optical fiber 22. As a result, the optical receptacle 52 and the optical plug 51 are optically connected to each other, and an optical signal emitted from an emission laser of the optical receptacle 52 is incident on the optical fiber 22, and the optical signal emitted from the optical fiber 22 is converted into an electric signal by a photodiode of the optical receptacle 52.

In addition, in order to connect the optical plug 51 and the optical receptacle 52, the plug holder 53 of the main line harness 11 is installed close to the optical receptacle 52 from the upper side orthogonal to the axial direction of the optical fiber 22, so that the male terminal 55 of the main line 21 is inserted into the female terminal 56 of the circuit board 40. As a result, the male terminal 55 of the main line 21 and the female terminal 56 of the circuit board 40 are electrically connected to each other.

In the branch connector 100A, the optical plug 51 and the optical receptacle 52 are connected to each other, and the male terminal 55 and the female terminal 56 of the main line 21 are connected to each other. Therefore, communication between the optical fiber 22 of the main line harness 11 and the communication line of the branch line 36 of the branch harness 12 becomes possible, and the main line 21 of the main line harness 11 and the power line and ground line of the branch line 36 of the branch harness 12 are electrically connected to each other.

As a result, power supply from the main line harness 11 and communication with the control box E become possible for the electrical components connected to the connector C of the branch harness 12, and it is possible to drive and control the electrical components.

Next, the structure of the optical connector 50A will be described in detail.

Figure 4A:
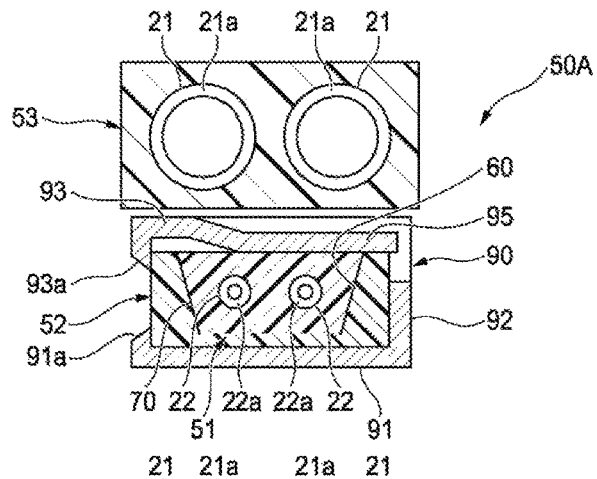
FIGS. 4A to 4C illustrate the optical connector.
Figure 4B:
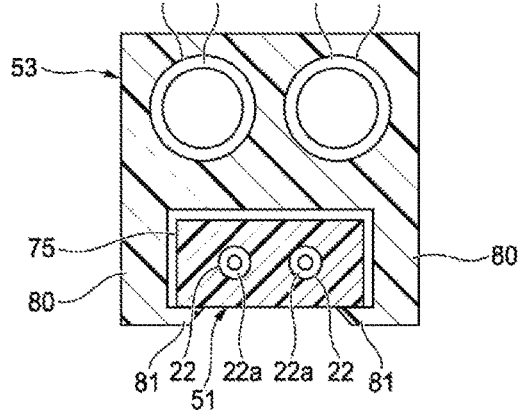
Figure 4C:
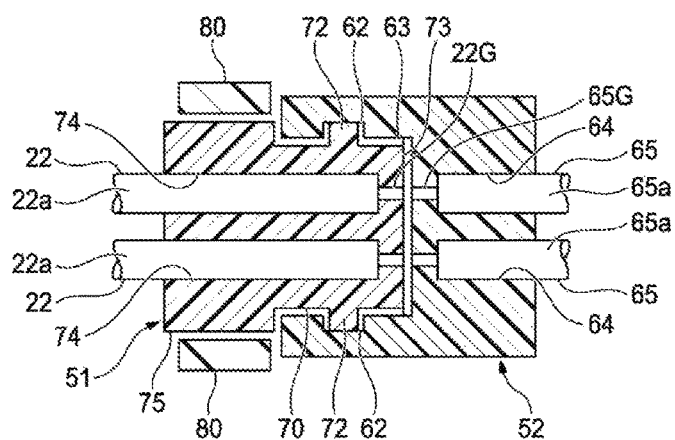
Figure 5A:
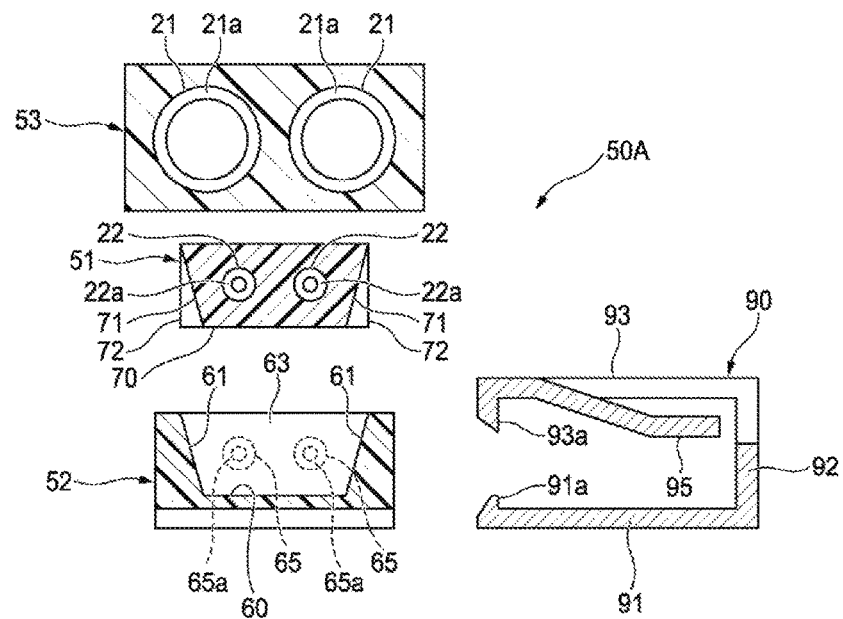
FIGS. 5A and 5B illustrate the optical connector.
Figure 5B:
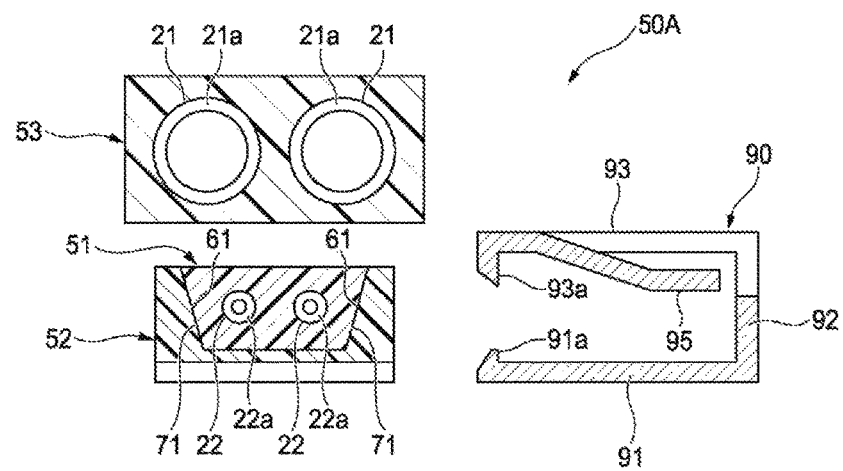

FIGS. 4A to 4C are views illustrating the optical connector, FIG. 4A is a cross-sectional view taken along a line A-A in FIG. 3 in the connected state, FIG. 4B is a cross-sectional view taken along a line B-B in FIG. 3 in the connected state, and FIG. 4C is a cross-sectional view taken along a line C-C in FIG. 3 in a connected state. FIGS. 5A and 5B are views illustrating the optical connector, FIG. 5A is a cross-sectional view taken along the line A-A in FIG. 3 before connection, and FIG. 5B is a cross-sectional view taken along the line A-A in FIG. 3 in the middle of connection.

As illustrated in FIGS. 4A to 4C and FIGS. 5A and 5B, the optical receptacle 52 has a fitting recessed portion 60 of which an upper side is opened. Both side walls 61 of the fitting recessed portion 60 are formed in a tapered shape gradually close toward the bottom side. On both side walls 61 of the fitting recessed portion 60, a positioning groove 62 is formed along the vertical direction.

The optical receptacle 52 has a plug joining surface 63 on the fitting recessed portion 60 side. In addition, in the optical receptacle 52, two fiber holding holes 64 are formed, and each of the fiber holding holes 64 are opened on the plug joining surfaces 63. In these fiber holding holes 64, the optical fiber 65 connected to the photoelectric conversion element such as a light emitting laser and a photodiode is inserted and held. The optical fiber 65 holds the glass fiber 65G exposed from the coating 65a at the end portion thereof (refer to FIG. 4C).

The optical plug 51 has a joining portion 70 which can be fitted to the fitting recessed portion 60 of the optical receptacle 52 on the front end side. The joining portion 70 is formed in a tapered shape in which both side surfaces 71 thereof are inclined at the same inclination angle as the both side walls 61 of the fitting recessed portion 60. On both side surfaces 71 of the joining portion 70, positioning projecting portions 72 are formed along the vertical direction.

The optical plug 51 has a receptacle joining surface 73 at the front end thereof. In addition, in the optical plug 51, two fiber holding holes 74 are formed and each of the fiber holding holes 74 are opened on the receptacle joining surfaces 73. In these fiber holding holes 74, the optical fiber 22 of the main line harness 11 is inserted and held. The optical fiber 22 holds the glass fiber 22G exposed from the coating 22a at the end portion thereof (refer to FIG. 4C).

The optical plug 51 has a held portion 75 at the rear end side thereof, and the held portion 75 is held by the plug holder 53. In the plug holder 53, a holding arm 80 extending downward is formed on both sides of the rear end side, and the held portion 75 of the optical plug 51 is accommodated between these holding arms 80. At the lower end of each of the holding arms 80, holding claws 81 projecting in a direction approaching each other are formed, and the lower surface side of the held portion 75 of the optical plug 51 is locked by these holding claws 81. As a result, the optical plug 51 is held at the lower portion of the plug holder 53. In this state, in the optical plug 51, gaps are formed between the upper surface and the plug holder 53, and between both side surfaces and the holding arm 80. As a result, the optical plug 51 held by the plug holder 53 can be displaced in the vertical and horizontal directions.

In addition, the optical connector 50A is provided with a clip 90. The clip 90 has a bottom plate 91, a side plate 92, and an upper plate 93. The clip 90 is formed in a U-shape in which the bottom plate 91 and the upper plate 93 extend from the upper and lower ends of the side plate 92. At the end portions of the bottom plate 91 and the upper plate 93, locking claws 91a and 93a projecting in a direction approaching each other are formed. In addition, the upper plate 93 has a pressing piece 95. One end of the pressing piece 95 is connected to the tip end side of the upper plate 93, and the other end thereof is curved and projects toward the bottom plate 91 side. The clip 90 is attached to the optical receptacle 52 in which the joining portion 70 of the optical plug 51 is fitted into the fitting recessed portion 60, from one side thereof. When the clip 90 is attached to the optical receptacle 52, the bottom plate 91 is disposed along the lower surface thereof, the side plate 92 is disposed along one side surface, and the upper plate 93 is disposed along the upper surface. In this attached state, in the clip 90, the locking claws 19a and 93a of the bottom plate 91 and the upper plate 93 lock the other sides of the optical receptacle 52, respectively. As a result, the clip 90 is maintained in a state of being attached to the joining portion 70. In addition, when the clip 90 is attached to the optical receptacle 52, the pressing piece 95 of the upper plate 93 of the clip 90 is brought into contact with the optical plug 51 and the joining portion 70 fitted into the fitting recessed portion 60 is pressed downward by the elastic force.

In the optical connector 50A having the above structure, in order to connect the optical plug 51 to the optical receptacle 52, when the plug holder 53 of the main line harness 11 is brought close to the optical receptacle 52 from the upper side orthogonal to the axial direction of the optical fiber 22 as illustrated in FIG. 5A, the joining portion 70 of the optical plug 51 held in the plug holder 53 is fitted into the fitting recessed portion 60 of the optical receptacle 52 from above as illustrated in FIG. 5B. Therefore, when the optical plug 51 is fitted into the fitting recessed portion 60, the tapered both side surfaces 71 of the joining portion 70 and the tapered both side walls 61 of the fitting recessed portion 60 come into contact with each other and slide, so that the joining portion 70 is positioned with respect to the fitting recessed portion 60 in the vertical and horizontal directions.

Thereafter, the clip 90 is attached to the optical receptacle 52 in which the joining portion 70 of the optical plug 51 is fitted into the fitting recessed portion 60, from one side thereof. Therefore, the joining portion 70 is pressed downward by the pressing piece 95 of the clip 90, both side surfaces 71 of the joining portion 70 and both side walls 61 of the fitting recessed portion 60 are brought into contact with each other, and the optical fiber 22 of the optical plug 51 is aligned with respect to the optical fiber 65 of the optical receptacle 52. In this manner, in the optical connector 50A, both side walls 61 of the fitting recessed portion 60 of the optical receptacle 52 and both side surfaces 71 of the joining portion 70 of the optical plug 51 serve as aligning means.

In addition, when the joining portion 70 is fitted into the fitting recessed portion 60, the positioning projecting portion 72 formed on the side surface 71 of the joining portion 70 fits into the positioning groove 62 formed in the side wall 61 of the fitting recessed portion 60. As a result, the optical plug 51 is positioned in the axial direction of the optical fiber 22 with respect to the optical receptacle 52 and the optical plug 51 is prevented from coming out from the optical receptacle 52.

In this manner, according to the above optical connector 50A, when the optical plug 51 is fitted into the fitting recessed portion 60 close to the optical receptacle 52 in the direction orthogonal to the axis of the optical fiber 22, both the side walls 61 of the fitting recessed portion 60 and both side surfaces 71 of the optical plug 51 are brought into contact with each other so that the optical fibers 22 and 65 are aligned with each other. As a result, the optical fibers 22 and 65 of the optical plug 51 and the optical receptacle 52 can be easily aligned with and optically connected to each other so as to enable optical communication with each other.

Therefore, compared to the structure in which the optical plugs 51 are brought close to each other along the axial direction of the optical fiber 22 with respect to the optical receptacle 52 to connect the optical fibers 22 and 65, it is possible to eliminate the work of loosening the optical fiber 22 before connection and securing an extra length in advance, and to improve connection workability.

According to the branch structure of the wire harness by the branch connector 100A provided with the optical connector 50A, since the joining direction of the optical plug 51 held by the plug holder 53 to the optical receptacle 52 and the connecting direction of the male terminal 55 to the female terminal 56 are the same direction as each other, it is possible to collectively perform the optical connection between the optical fibers 22 and 65 and the electrical connection between the male terminal 55 and the female terminal 56. As a result, it is possible to significantly improve branch connection workability of connecting the branch harness 12 to the main line harness 11 to branch the branch harness 12 and the main line harness 11.

Next, another embodiment of the optical connector will be described.

The same components as those of the first embodiment are denoted by the same reference numerals, and description thereof will be omitted.

Second Embodiment

Figure 6:
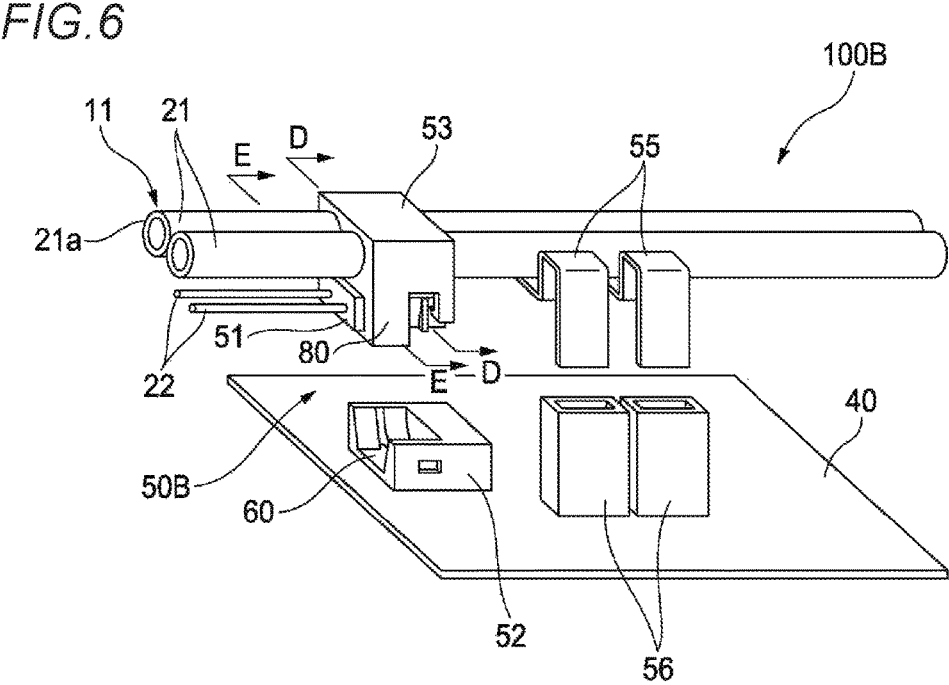
FIG. 6 is an exploded perspective view of a branch connector provided with an optical connector according to a second embodiment.
Figure 7A:
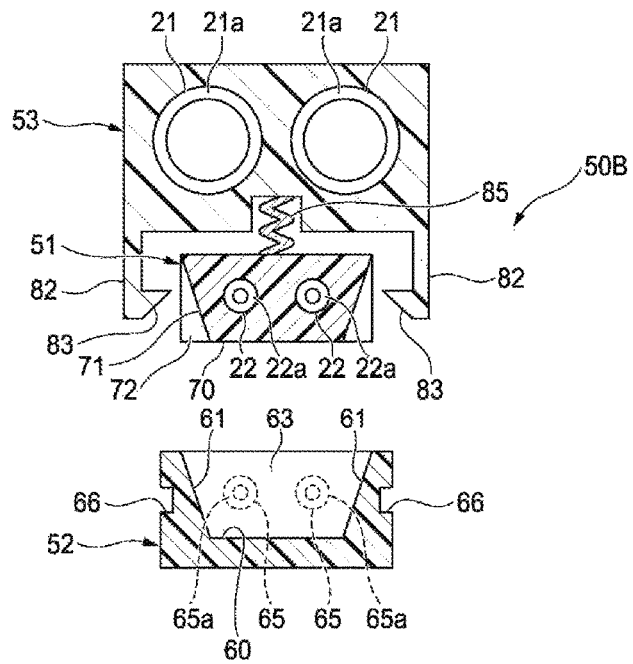
FIGS. 7A and 7B illustrate the optical connector.
Figure 7B:
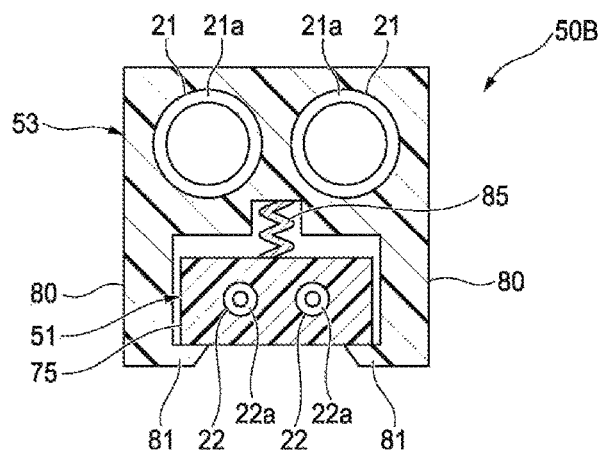
Figure 8A:
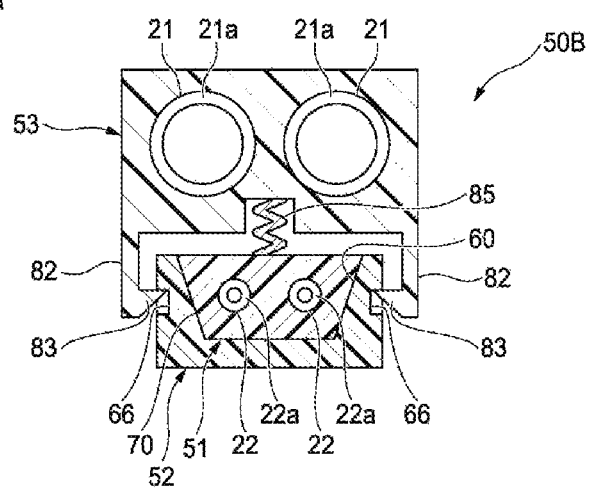
FIGS. 8A and 8B illustrate the optical connector.
Figure 8B:
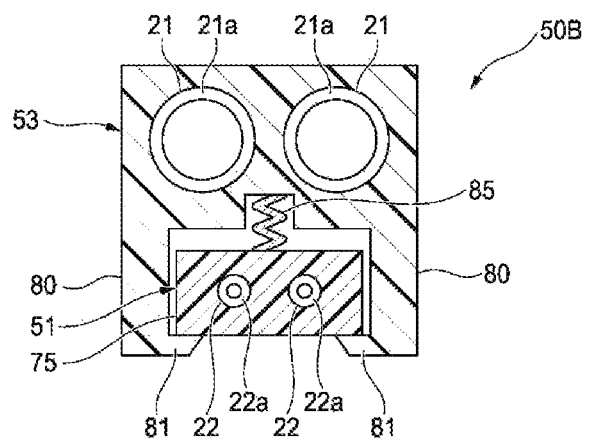

FIG. 6 is an exploded perspective view of a branch connector provided with an optical connector according to a second embodiment. FIGS. 7A and 7B are views illustrating the optical connector, FIG. 7A is a cross-sectional view taken along a line D-D in FIG. 6 before connection, and FIG. 7B is a cross-sectional view taken along a line E-E in FIG. 6 before connection. FIGS. 8A and 8B are views illustrating the optical connector, FIG. 8A is a cross-sectional view taken along the line D-D in FIG. 6 after connection, and FIG. 8B is a cross-sectional view taken along the line E-E in FIG. 6 after connection.

As illustrated in FIG. 6, a branch connector 100B is provided with an optical connector 50B according to the second embodiment.

As illustrated in FIGS. 7A and 7B and FIGS. 8A and 8B, in the optical connector 50B, locking holes 66 are formed in both side surfaces of the optical receptacle 52. In addition, in the plug holder 53 holding the optical plug 51, locking arms 82 extending downward are formed on both side portions on the front end side, and the joining portion 70 of the optical plug 51 is disposed between these locking arms 82. At the lower end of each of the locking arms 82, the locking claws 83 projecting in a direction approaching each other are formed.

In addition, a pressing spring 85 is provided between the optical plug 51 and the plug holder 53, and the optical plug 51 is urged downward against the plug holder 53 by the pressing spring 85. As a result, as illustrated in FIG. 7B, the optical plug 51 is brought into a state where the held portion 75 is pressed against the holding claw 81 of the holding arm 80 of the plug holder 53.

In the optical connector 50B having the above structure, in order to connect the optical plug 51 to the optical receptacle 52, when the plug holder 53 of the main line harness 11 is brought close to the optical receptacle 52 from the upper side orthogonal to the axial direction of the optical fiber 22 as illustrated in FIG. 7A, the joining portion 70 of the optical plug 51 held by the plug holder 53 is fitted into the fitting recessed portion 60 of the optical receptacle 52 from above as illustrated in FIG. 8A. Therefore, when the optical plug 51 is fitted into the fitting recessed portion 60, the tapered both side surfaces 71 of the joining portion 70 and the tapered both side walls 61 of the fitting recessed portion 60 come into contact with each other and slide, so that the joining portion 70 is positioned with respect to the fitting recessed portion 60 in the vertical and horizontal directions. The optical plug 51 is pressed downward by the pressing spring 85, both side surfaces 71 of the joining portion 70 and both side walls 61 of the fitting recessed portion 60 are brought into contact with each other, and the optical fiber 22 of the optical plug 51 is aligned with respect to the optical fiber 65 of the optical receptacle 52. At this time, the optical plug 51 is displaced to the plug holder 53 side against the urging force of the pressing spring 85. Therefore, as illustrated in FIG. 8B, the held portion 75 of the optical plug 51 is in a state slightly separated from the holding claw 81 of the holding arm 80 of the plug holder 53.

In addition, in the optical connector 50B, in a state where the joining portion 70 is fitted into the fitting recessed portion 60, the locking claw 83 of the locking arm 82 of the plug holder 53 enters the locking hole 66 of the optical receptacle 52. As a result, the locking claw 83 locks the optical receptacle 52, so that the connection state between the optical receptacle 52 and the optical plug 51 is maintained.

In the case of the optical connector 50B, when the joining portion 70 is fitted into the fitting recessed portion 60, the positioning projecting portion 72 formed on the side surface 71 of the joining portion 70 is fitted into the positioning groove 62 formed in the side wall 61 of the fitting recessed portion 60. As a result, the optical plug 51 is positioned in the axial direction of the optical fiber 22 with respect to the optical receptacle 52 and the optical plug 51 is prevented from coming out with respect to the optical receptacle 52.

According to the optical connector 50B according to the second embodiment, the optical plug 51 is brought close to the optical receptacle 52 from the direction orthogonal to the axis of the optical fiber 22 and fitted into the fitting recessed portion 60. Therefore, it is possible to optically connect the optical fibers 22 and 65 of the optical plug 51 and the optical receptacle 52 with both the side walls 61 of the fitting recessed portion 60 and both side surfaces 71 of the joining portion 70 of the optical plug 51 being brought into contact with each other and aligned with each other, without loosening the optical fiber 22 and securing an extra length in advance, and to improve connection workability.

Third Embodiment

Figure 9:
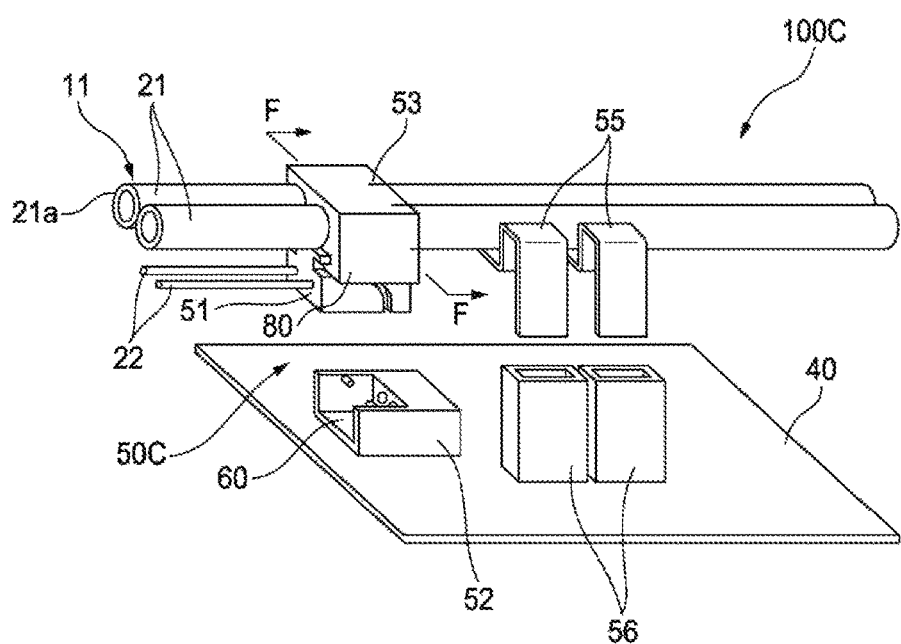
FIG. 9 is an exploded perspective view of a branch connector provided with an optical connector according to a third embodiment.
Figure 10:
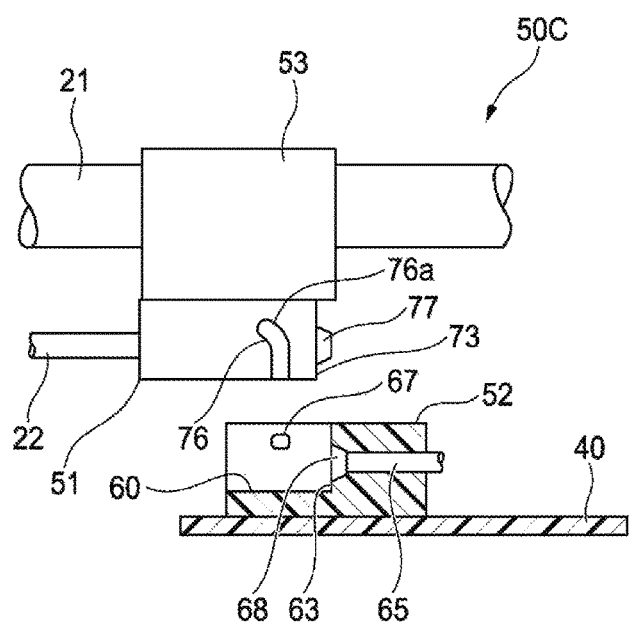
FIG. 10 is the side view of a plug holder in a cross-sectional view of an optical receptacle.
Figure 11:
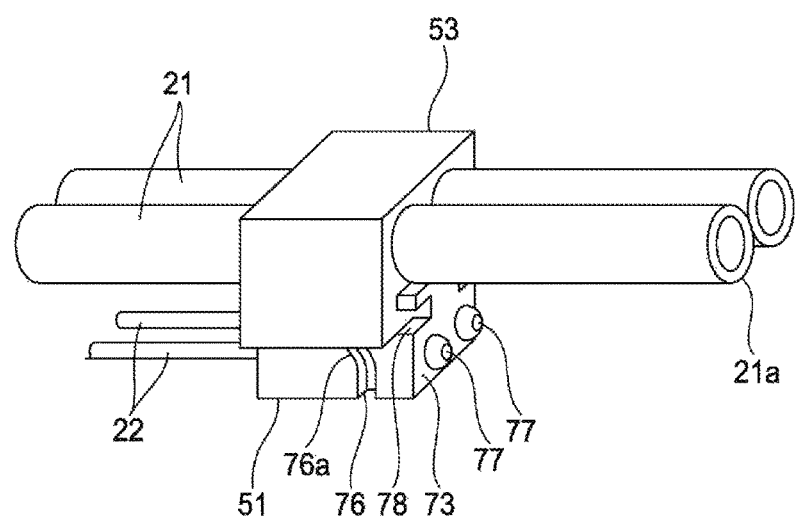
FIG. 11 is a perspective view of the plug holder holding an optical plug as viewed from the front.
Figure 12:
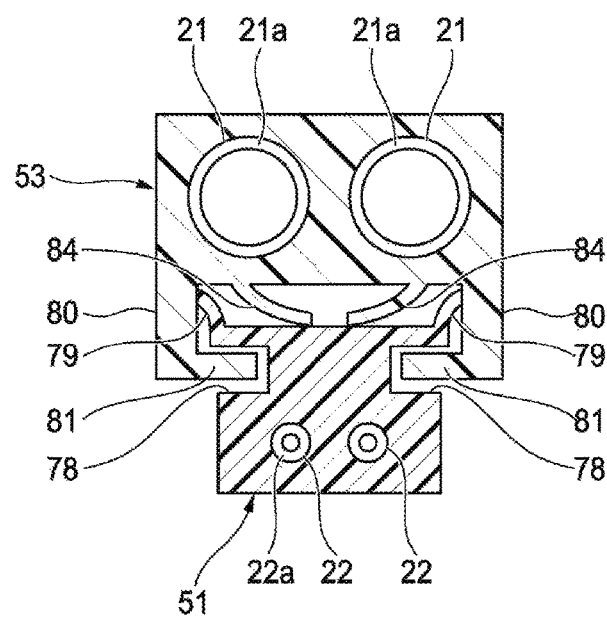
FIG. 12 is a cross-sectional view taken along a line F-F in FIG. 9.
Figure 13A:
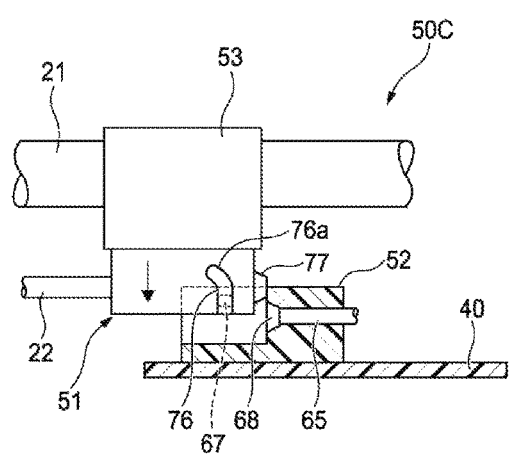
FIGS. 13A and 13B illustrate the optical connector.
Figure 13B:
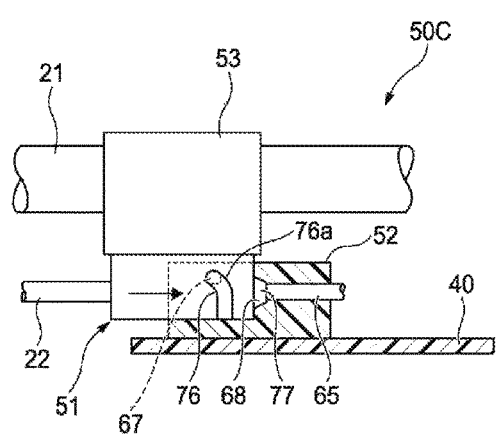

FIG. 9 is an exploded perspective view of a branch connector provided with an optical connector according to a third embodiment. FIG. 10 is the side view of a plug holder in a cross-sectional view of an optical receptacle. FIG. 11 is a perspective view of the plug holder holding an optical plug as viewed from the front. FIG. 12 is a cross-sectional view taken along a line F-F in FIG. 9. FIGS. 13A and 13B are views illustrating the optical connector, FIG. 13A is a side view of a plug holder in a cross-sectional view of the optical receptacle in the middle of connection, and FIG. 13B is a side view of a plug holder in a cross-sectional view of the optical receptacle after connection.

As illustrated in FIGS. 9 and 10, a branch connector 100C is provided with an optical connector 50C according to the third embodiment. In the optical connector 50C, both side walls 61 of the fitting recessed portion 60 of the optical receptacle 52 are not tapered but are parallel to each other along the vertical direction. Bosses 67 are formed on both side walls 61 of the fitting recessed portion 60 in the vicinity of the upper portion thereof. In addition, on the plug joining surface 63 of the optical receptacle 52, an aligning recessed portion 68 having a circular shape gradually narrowed in a cross-sectional view is formed in the opening portion of the fiber holding hole 64.

As illustrated in FIG. 11, both side surfaces 71 of the optical plug 51 are not tapered but are parallel to each other along the vertical direction. On both side surfaces 71 of the optical plug 51, cam grooves 76 are formed. In the cam groove 76, the lower end of the optical plug 51 is open, and the upper end portion has a bent portion 76a bent toward the rear side of the optical plug 51. In addition, on the receptacle joining surface 73 of the optical plug 51, an aligning projecting portion 77 having a circular shape gradually narrowed in a cross-sectional view is formed in the opening portion of the fiber holding hole 74.

As illustrated in FIG. 12, groove portions 78 extending in the front-rear direction are formed in the vicinity of the upper portions of both side surfaces 71 of the optical plug 51, and the holding claw 81 of the holding arm 80 of the plug holder 53 is engaged in the groove portions 78. As a result, the optical plug 51 is held with respect to the plug holder 53 so as to be displaceable in the front-rear direction and in the vertical and horizontal directions. Furthermore, on both upper ends of the optical plug 51, a pressing plate portion 79 which laterally projects and comes into contact with the holding arm 80 is formed. In addition, on the lower surface of the plug holder 53, an elastic plate portion 84 for pressing the optical plug 51 downward is formed. As a result, the optical plug 51 is held without rattling against the plug holder 53.

In the optical connector 50C having the above structure, in order to connect the optical plug 51 to the optical receptacle 52, when the plug holder 53 of the main line harness 11 is brought close to the optical receptacle 52 from the upper side orthogonal to the axial direction of the optical fiber 22, the optical plug 51 held by the plug holder 53 enters the fitting recessed portion 60 of the optical receptacle 52 from above and the boss 67 is inserted into the cam groove 76 as illustrated in FIG. 13A. When the boss 67 is inserted, the cam groove 76 is positioned from the receptacle joining surface 73 so that the aligning projecting portion 77 of the optical plug 51 does not interfere with the plug joining surface 63 of the optical receptacle 52.

Furthermore, when the plug holder 53 of the main line harness 11 is pushed in the direction orthogonal to the axial direction of the optical fiber 22 with respect to the optical receptacle 52, as illustrated in FIG. 13B, the boss 67 enters the bent portion 76a bent to the rear of the cam groove 76, so that the optical plug 51 is pressed forward and displaced with respect to the plug holder 53. Therefore, the aligning projecting portion 77 of the optical plug 51 is fitted into the aligning recessed portion 68 of the optical receptacle 52, and the optical fiber 22 of the optical plug 51 is aligned with respect to the optical fiber 65 of the optical receptacle 52. As a result, the optical fiber 65 of the optical receptacle 52 and the optical fiber 22 of the optical plug 51 are optically connected to each other so as to enable optical communication with each other. In this manner, in the optical connector 50C, aligning means is configured to include the aligning recessed portion 68 and the aligning projecting portion 77 which are fitted into each other, and pressing means for pressing the optical plug 51 to the optical receptacle 52 is configured to include the boss 67 and the cam groove 76.

According to the optical connector 50C according to the third embodiment, when the optical plug 51 is fitted into the fitting recessed portion 60 by installing the plug holder 53 close to the optical receptacle 52 from the direction of orthogonal to the axis of the optical fiber 22, the aligning projecting portion 77 serving as the aligning means and the aligning recessed portion 68 are fitted with each other by the pressing means including the boss 67 and the cam groove 76 so that the optical fibers 22 and 65 are aligned with each other. As a result, the optical fibers 22 and 65 of the optical plug 51 and the optical receptacle 52 are easily aligned with and optically connected to each other so as to enable optical communication with each other.

Therefore, compared to the optical connector that connects the optical fibers by bringing the connector portions close to each other along the axial direction of the optical fiber, it is possible to eliminate the work of loosening the optical fiber before connection and securing an extra length in advance, and to improve connection workability.

Fourth Embodiment

Figure 14:
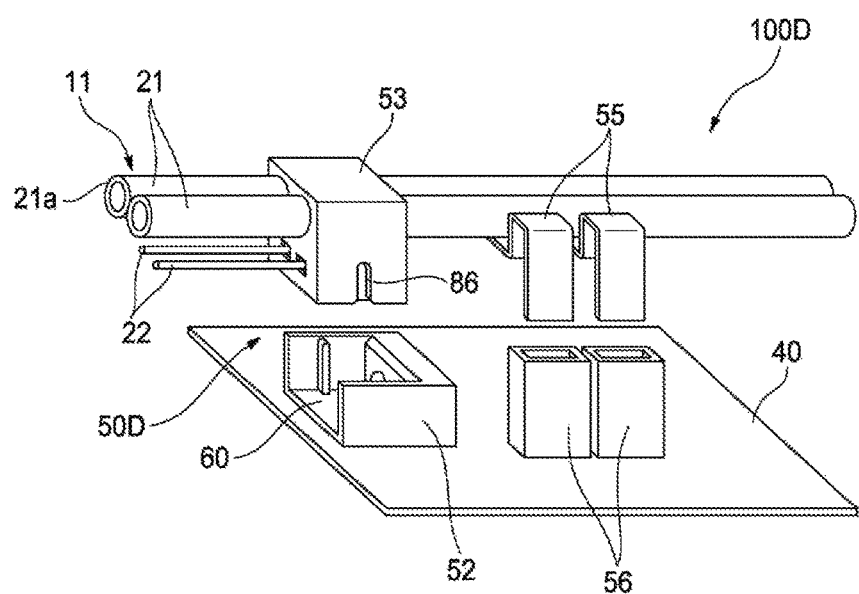
FIG. 14 is an exploded perspective view of a branch connector including an optical connector according to a fourth embodiment.
Figure 15:
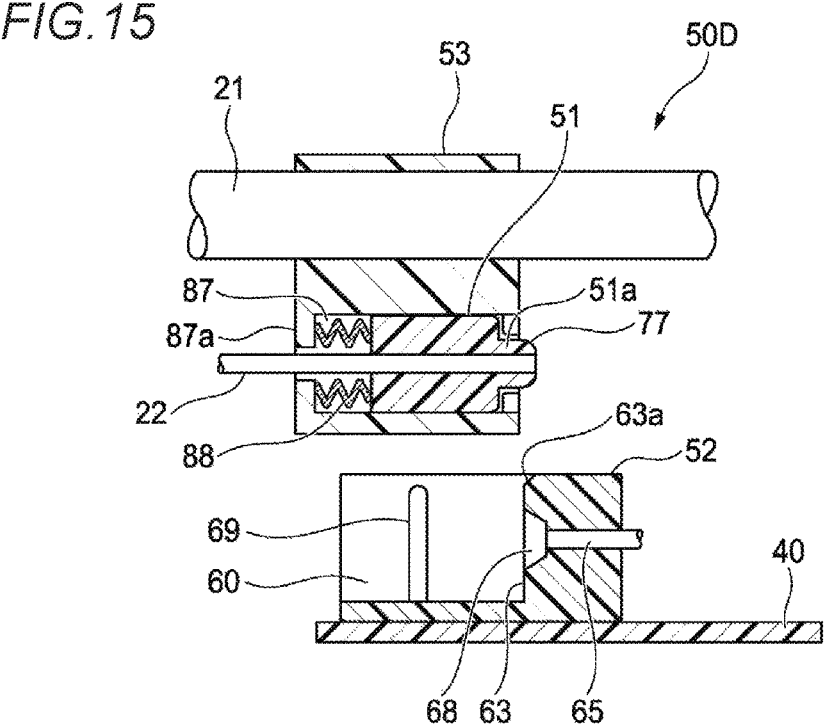
FIG. 15 is a cross-sectional view of the optical receptacle, the optical plug, and the plug holder, respectively.
Figure 16:
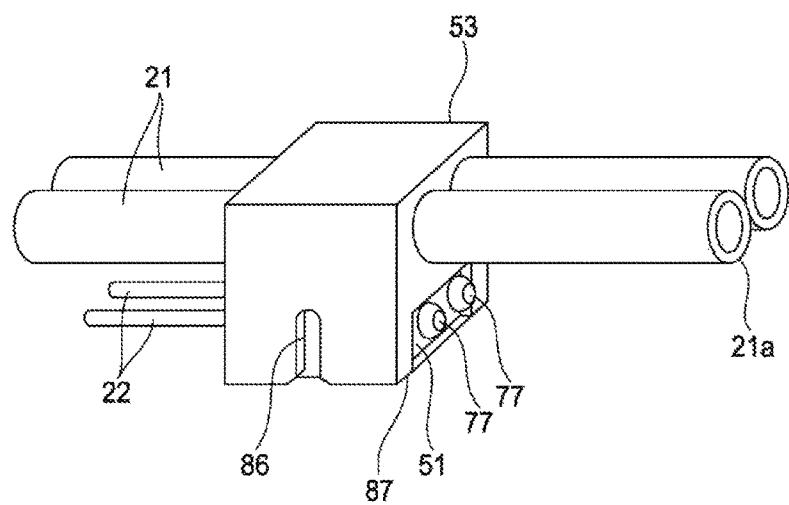
FIG. 16 is a perspective view of the plug holder holding the optical plug as viewed from the front.
Figure 17A:
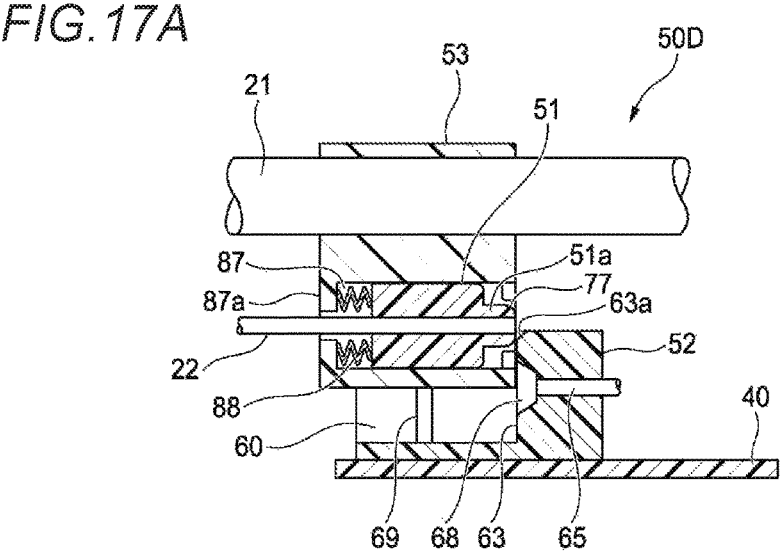
FIGS. 17A and 17B illustrate an optical connector.
Figure 17B:
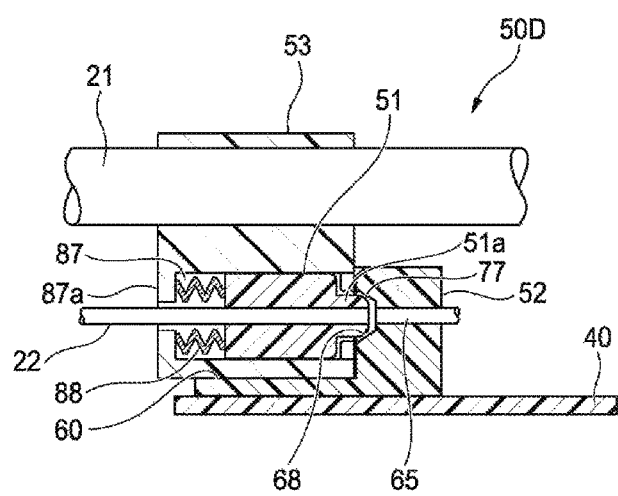
Figure 18:
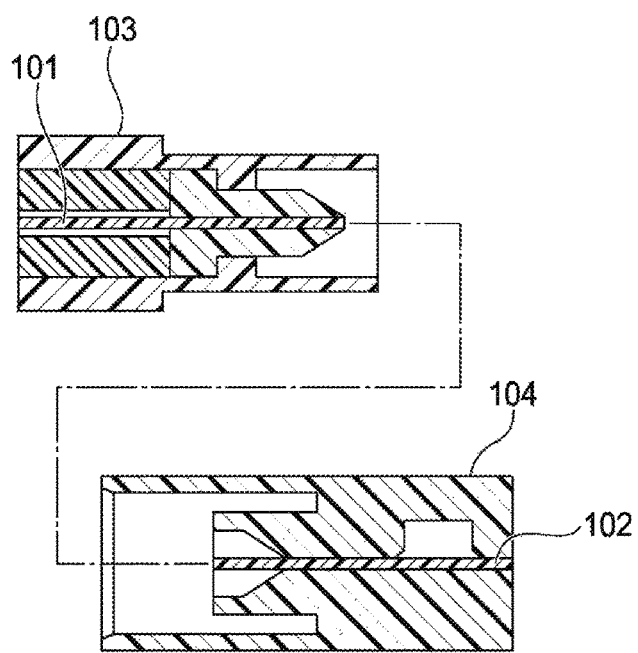
FIG. 18 is a cross-sectional view taken along the axial direction of the optical fiber of the optical connector that performs optical communication by connecting optical fibers to each other.
Figure 19:
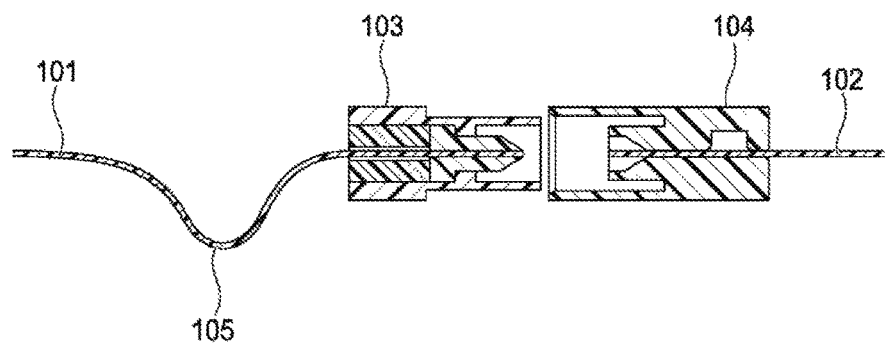
FIG. 19 is a cross-sectional view taken along the axial direction of the optical fiber that describes an extra length of the optical fiber at the time of connection.

FIG. 14 is an exploded perspective view of a branch connector including an optical connector according to a fourth embodiment. FIG. 15 is a cross-sectional view of the optical receptacle, the optical plug, and the plug holder, respectively. FIG. 16 is a perspective view of the plug holder holding the optical plug as viewed from the front. FIGS. 17A and 17B are views illustrating an optical connector, FIG. 17A is a longitudinal sectional view along an axis of an optical fiber in the middle of connection, and FIG. 17B is a longitudinal sectional view taken along the axis of the optical fiber after connection.

As illustrated in FIGS. 14 and 15, a branch connector 100D is provided with an optical connector 50D according to the fourth embodiment. In the optical connector 50D, both side walls 61 of the fitting recessed portion 60 of the optical receptacle 52 are parallel to each other along the vertical direction, and in the plug joining surface 63, the aligning recessed portion 68 which gradually narrows is formed on the opening portion of the fiber holding hole 64. In addition, engagement projections 69 along the vertical direction are formed in both side walls 61 of the fitting recessed portion 60. Furthermore, in the plug joining surface 63 of the optical receptacle 52, a tapered guide surface 63a is formed at the upper edge portion thereof.

As illustrated in FIG. 16, engagement grooves 86 along the vertical direction are formed in both side surfaces of the plug holder 53. The engagement groove 86 is open at the lower end of the plug holder 53. In addition, an accommodation recessed portion 87 of which the front side is opened is formed in the plug holder 53, and the optical plug 51 is accommodated in the accommodation recessed portion 87. A projection 51a having the aligning projecting portion 77 at the tip end is formed in the front portion of the optical plug 51. In addition, a spring 88 is provided between the rear surface plate 87a forming the accommodation recessed portion 87 of the plug holder 53 and the rear surface of the optical plug 51. The optical plug 51 accommodated in the accommodation recessed portion 87 of the plug holder 53 is held in the plug holder 53 in a state where the aligning projecting portion 77 of the projection 51a projecting from the front of the plug holder 53.

In the optical connector 50D having the above structure, in order to connect the optical plug 51 to the optical receptacle 52, when the plug holder 53 of the main line harness 11 is brought close to the optical receptacle 52 from the upper side orthogonal to the axial direction of the optical fiber 22, the plug holder 53 holding the optical plug 51 enters the fitting recessed portion 60 of the optical receptacle 52 from above, and the engagement projection 69 is inserted into the engagement groove 86 as illustrated in FIG. 17A. In addition, the aligning projecting portion 77 of the projection 51a of the optical plug 51 projecting from the front of the plug holder 53 is brought into contact with the guide surface 63a of the optical receptacle 52 and slides. As a result, the optical plug 51 is pushed into the accommodation recessed portion 87 against the urging force of the spring 88.

Furthermore, when the aligning projecting portion 77 reaches the aligning recessed portion 68 by pushing the plug holder 53 of the main line harness 11 in the direction orthogonal to the axial direction of the optical fiber 22 with respect to the optical receptacle 52, the optical plug 51 pushed into the accommodation recessed portion 87 against the urging force of the spring 88 is pressed forward by the urging force of the spring 88 and displaced as illustrated in FIG. 17B, the aligning projecting portion 77 is fitted into the aligning recessed portion 68, and the optical fiber 22 of the optical plug 51 is aligned with respect to the optical fiber 65 of the optical receptacle 52. As a result, the optical fiber 65 of the optical receptacle 52 and the optical fiber 22 of the optical plug 51 are optically connected to each other so as to enable optical communication with each other.

According to the optical connector 50D according to the fourth embodiment, the plug holder 53 is installed close to the optical receptacle 52 from the direction of orthogonal to the axis of the optical fiber 22, so that the aligning projecting portion 77 serving as the aligning means and the aligning recessed portion 68 are fitted with each other and the optical fibers 22 and 65 are aligned with each other by the pressing means including the spring 88. As a result, the optical fibers 22 and 65 of the optical plug 51 and the optical receptacle 52 are easily aligned with and optically connected to each other so as to enable optical communication with each other.

The invention is not limited to the above-described embodiment, and can be appropriately modified, improved, and the like. In addition, materials, shapes, dimensions, numbers, placement locations, and the like of each constituent element in the above-described embodiment are arbitrary as long as the invention can be achieved, and are not limited.

Here, the features of the embodiment of the optical connector and the branch structure of the wire harness according to the invention described above are summarized briefly in the following [1] to [3], respectively.

[1] An optical connector comprising:
 a first connector portion (optical plug 51) having a first optical fiber (22);
 a second connector portion (optical receptacle 52) having a second optical fiber (65); and
 an aligning part,
 wherein the second connector portion includes a fitting recessed portion (60) in which the first connector portion (optical plug 51) is fitted;
 wherein the second connector portion (optical receptacle 52) is joined closely in a direction orthogonal to axes of the first and second optical fibers (22 and 65) by the first connector portion (optical plug 51);
 wherein the aligning part includes side walls (61) of the fitting recessed portion (60) gradually closing to each other in a fitting direction of the first connector portion (optical plug 51) to the fitting recessed portion (60);
 wherein inclination angles of side surfaces (71) of the first connector portion correspond to inclination angles of the side walls (61) of the fitting recessed portion (60);
 wherein the aligning part joins the first connector portion (optical plug 51) to the second connector portion(optical receptacle 52) so as to align the first and second optical fibers (22 and 65) with each other, and
 wherein the first connector portion (optical plug 51) is fitted into the fitting recessed portion (60) of the second connector portion (optical receptacle 52) and the side walls (61) and the side surfaces (71) are into contact with each other, so that the first and second optical fibers (22 and 65) are aligned with each other.

[2] An optical connector comprising:
 a first connector portion (optical plug 51) having a first optical fiber (22);
 a second connector portion (optical receptacle 52) having a second optical fiber (65);
 an aligning part; and
 a pressing part,
 wherein the second connector portion (optical receptacle 52) includes a fitting recessed portion (60) in which the first connector portion (optical plug 51) is fitted;
 wherein the second connector portion (optical receptacle 52) is joined closely in a direction orthogonal to axes of the first and second optical fibers (22 and 65) by the first connector portion (optical plug 51);
 wherein the first connector portion (optical plug 51) is fitted into the fitting recessed portion (60), and the pressing part presses the first connector portion (optical plug 51) towards the second connector portion (optical receptacle 52) along an axial direction of the first and second optical fibers (22 and 65);
 wherein the aligning part includes an aligning recessed portion (68) and an aligning projecting portion (77) which are mutually fitted into each other;
 wherein the aligning part joins the first connector portion (optical plug 51) to the second connector portion (optical receptacle 52) and aligns the first and second optical fibers (22 and 65) with each other;
 wherein each of the aligning recessed portion and the aligning projecting portion has a circular shape gradually narrowing towards a fitting direction of the aligning projecting portion to the aligning recessed portion in a cross-sectional view, and
 wherein the aligning recessed portion (68) and the aligning projecting portion (77) are fitted to each other and the first and second optical fibers (22 and 65) are aligned with each other.

[3] A branch structure of a wire harness comprising:
 a branch connector (100A to 100D) including the optical connector (50A to 50D) according to claim 1 or 2,
 wherein the branch connector (100A to 100D) branches and connects a branch harness (12) having a plurality of branch lines (36) to a main line harness (11) having a plurality of main lines (21);
 wherein the branch connector (100A to 100D) includes a circuit board (40) to which the branch line (36) is connected, a board side terminal (female terminal 56) mounted on the circuit board (40), and a main line side terminal (male terminal 55) connected to the main line (21) and connectable to the board side terminal (female terminal 56);
 wherein the first connector portion is held in a holder (plug holder 53) provided in the main line (21);
 wherein the second connector portion (optical receptacle 52) is mounted on the circuit board (40), and
 wherein a joining direction of the first connector portion (optical plug 51) held in the holder (plug holder 53) to the second connector portion (optical receptacle 52) and a connecting direction of the main line side terminal (male terminal 55) to the board side terminal (female terminal 56) are the same direction.

DESCRIPTION OF REFERENCE NUMERALS AND SIGNS

10: Wire harness
11: Main line harness

12: Branch harness
21: Main line
22 and 65: Optical fiber
36: Branch line
40: Circuit board
50A to 50D: Optical connector
51: Optical plug (first connector portion)
52: Optical receptacle (second connector portion)
53: Plug holder (holder)
55: Male terminal (main line side terminal)
56: Female terminal (board side terminal)
60: Fitting recessed portion
61: Side wall (aligning means)
67: Boss (pressing means)
68: Aligning recessed portion (aligning means)
71: Side surface (aligning means)
76: Cam groove (pressing means)
77: Aligning projecting portion (aligning means)
88: Spring (pressing means)
100A to 100D: Branch connector

What is claimed is:

1. An optical connector comprising:
a first connector portion having a first optical fiber;
a second connector portion having a second optical fiber; and
an aligning part,
wherein the second connector portion includes a fitting recessed portion in which the first connector portion is fitted;
wherein the second connector portion is joined closely in a direction orthogonal to axes of the first and second optical fibers by the first connector portion;
wherein the aligning part includes side walls of the fitting recessed portion gradually closing to each other in a fitting direction of the first connector portion to the fitting recessed portion, and to side surfaces of the first connector portion;
wherein inclination angles of the side surfaces of the first connector portion correspond to inclination angles of the side walls of the fitting recessed portion;
wherein the aligning part joins the first connector portion to the second connector portion so as to align the first and second optical fibers with each other, and
wherein the first connector portion is fitted into the fitting recessed portion of the second connector portion and the side walls and the side surfaces are in contact with each other, so that the first and second optical fibers are aligned with each other.

2. An optical connector comprising:
a first connector portion having a first optical fiber;
a second connector portion having a second optical fiber;
an aligning part; and
a pressing part,
wherein the second connector portion includes a fitting recessed portion in which the first connector portion is fitted;
wherein the second connector portion is joined closely in a direction orthogonal to axes of the first and second optical fibers by the first connector portion;
wherein the first connector portion is fitted into the fitting recessed portion, and the pressing part presses the first connector portion towards the second connector portion along an axial direction of the first and second optical fibers;
wherein the aligning part includes an aligning recessed portion and an aligning projecting portion which are mutually fitted into each other;
wherein the aligning part joins the first connector portion to the second connector portion and aligns the first and second optical fibers with each other;
wherein each of the aligning recessed portion and the aligning projecting portion has a circular shape gradually narrowing towards a fitting direction of the aligning projecting portion to the aligning recessed portion in a cross-sectional view, and
wherein the aligning recessed portion and the aligning projecting portion are fitted to each other and the first and second optical fibers are aligned with each other.

3. A branch structure of a wire harness comprising:
a branch connector including the optical connector according to claim 1,
wherein the branch connector branches and connects a branch harness having a plurality of branch lines to a main line harness having a plurality of main lines;
wherein the branch connector includes a circuit board to which the branch lines are connected, a board side terminal mounted on the circuit board, and a main line side terminal connected to the main line harness and connectable to the board side terminal;
wherein the first connector portion is held in a holder provided in the main line harness;
wherein the second connector portion is mounted on the circuit board, and
wherein a joining direction of the first connector portion held in the holder to the second connector portion and a connecting direction of the main line side terminal to the board side terminal are the same direction.

4. A branch structure of a wire harness comprising:
a branch connector including the optical connector according to claim 2,
wherein the branch connector branches and connects a branch harness having a plurality of branch lines to a main line harness having a plurality of main lines;
wherein the branch connector includes a circuit board to which the branch lines are connected, a board side terminal mounted on the circuit board, and a main line side terminal connected to the main line harness and connectable to the board side terminal;
wherein the first connector portion is held in a holder provided in the main line harness;
wherein the second connector portion is mounted on the circuit board, and
wherein a joining direction of the first connector portion held in the holder to the second connector portion and a connecting direction of the main line side terminal to the board side terminal are the same direction.

* * * * *